Oct. 23, 1962        H. J. WARD, JR        3,059,887
HEAVY DUTY WOODEN PALLET AND METHOD OF MANUFACTURE
Filed May 19, 1959        2 Sheets-Sheet 1
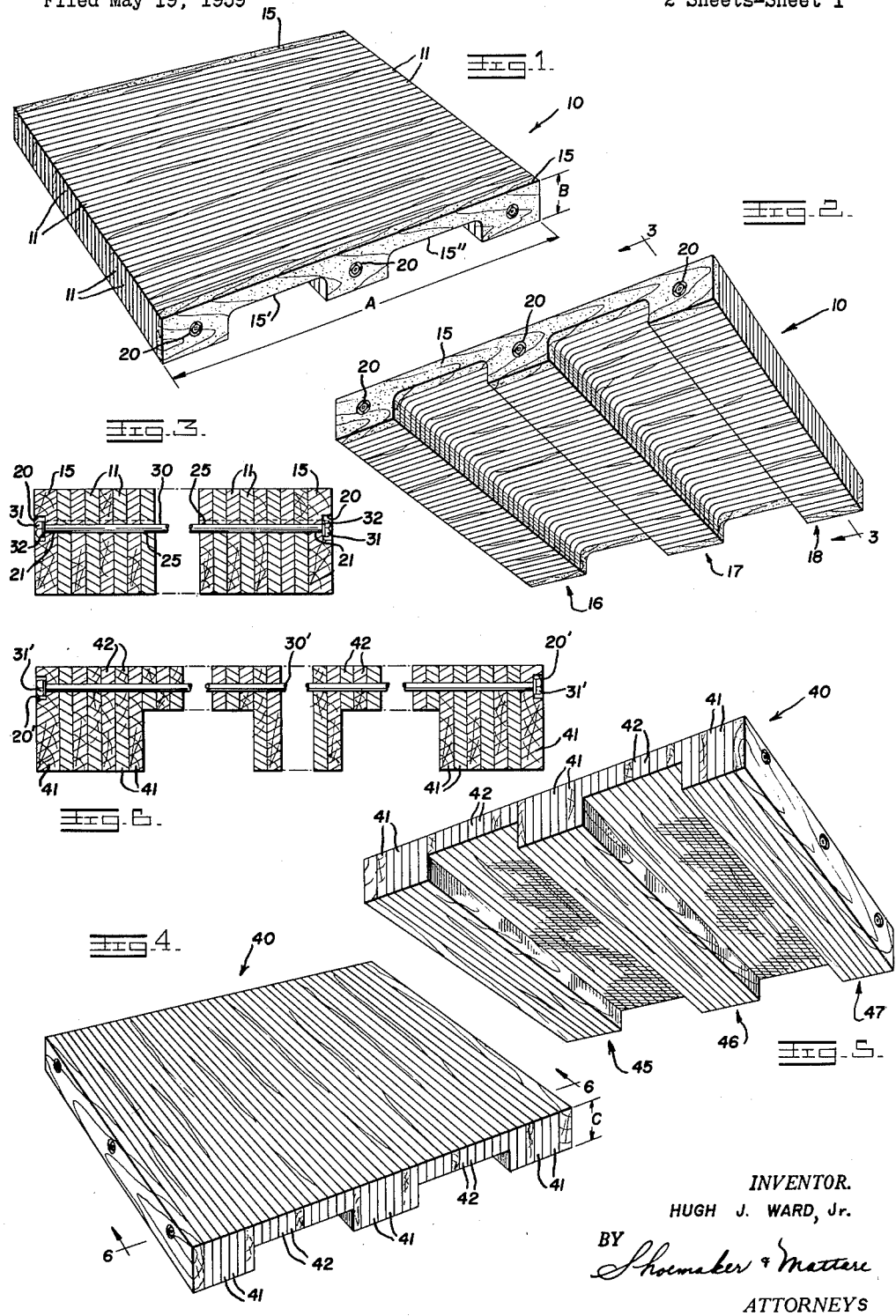
INVENTOR.
HUGH J. WARD, Jr.
BY *Shoemaker & Mattare*
ATTORNEYS

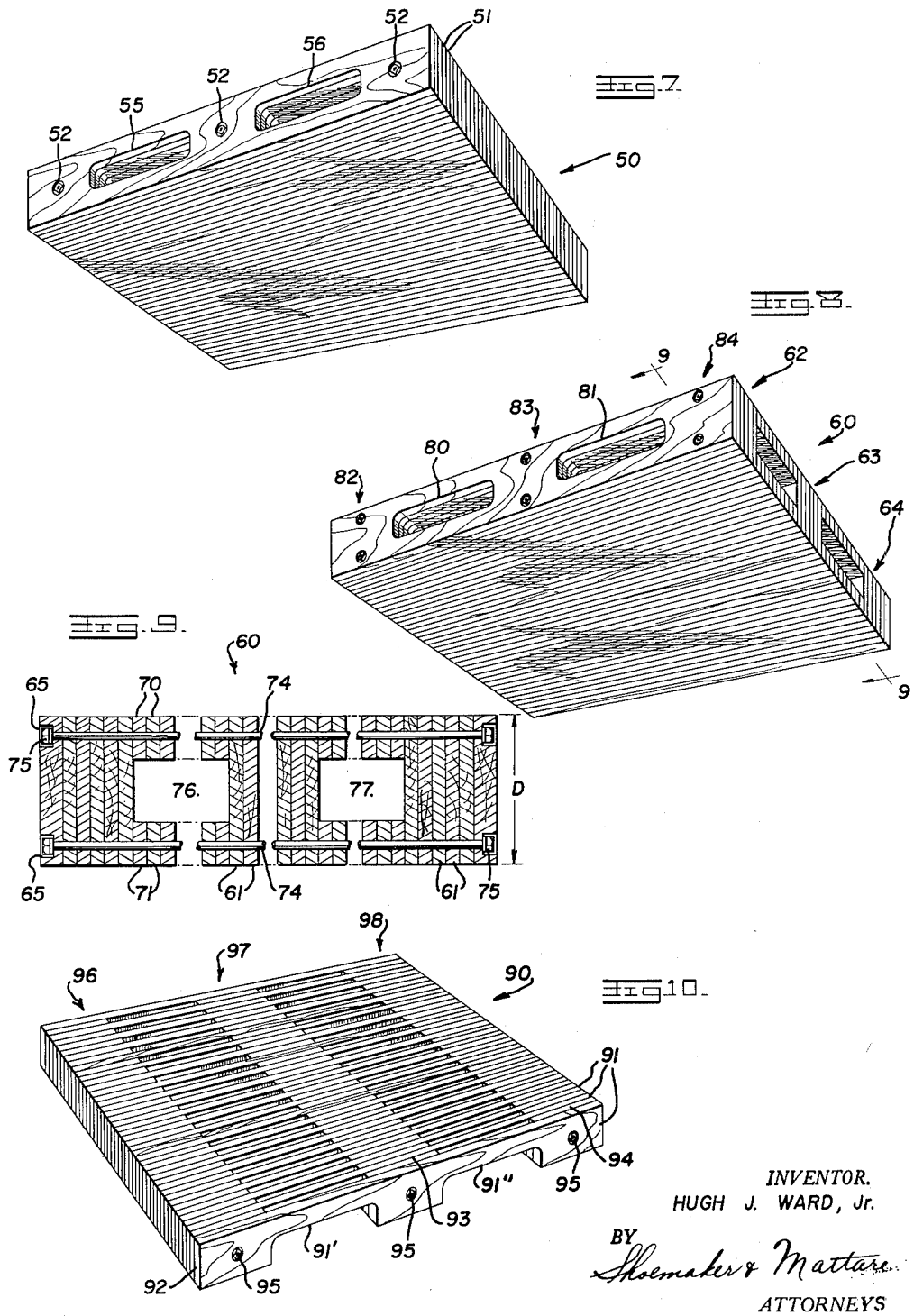

United States Patent Office 3,059,887
Patented Oct. 23, 1962

3,059,887
HEAVY DUTY WOODEN PALLET AND METHOD
OF MANUFACTURE
Hugh J. Ward, Jr., North Caldwell, N.J., assignor to U.S.
Pallet Co., Inc., Kearny, N.J., a corporation of New
Jersey
Filed May 19, 1959, Ser. No. 814,332
8 Claims. (Cl. 248—120)

The present invention relates to a new and novel heavy-duty wooden pallet and method of manufacture wherein the pallet consists of a plurality of boards disposed in abutting relationship with one another.

Wooden pallets are commonly used for stacking boxes or other types of loads thereon, the pallet serving not only as a convenient means for supporting the load above the floor, but also providing a very useful means for material handling whereby a plurality of small boxes or the like can be lifted and transported from one spot to another by lifting a single pallet having many different boxes or other types of material stacked thereon.

In order to facilitate such material handling, conventional wooden pallets are ordinarily provided with a pair of fork ways which are adapted to receive the fork arms of a fork truck, whereby the fork arms can be inserted within the fork ways in a well-known manner and the pallet and load lifted as a unit.

Conventional pallets now widely in use employ a plurality of stringers, usually three in number having a plurality of transversely extending deck boards spanning the stringers, the deck boards usually being spaced from one another. This construction is, of course, relatively light-weight and cheap, but has proved disadvantageous for a number of reasons.

Conventional wooden pallets are so constructed that the deck boards are nailed or stapled to the stringers. This construction is suitable for ordinary use, but it is very susceptible to damage when the pallet is accidentally dropped or when the fork arms of the fork truck are misaligned with the fork ways such that the fork arms may strike the end edges of the deck boards or the ends of the stringers. This has proved to be a major problem in the art since the deck boards are often loosened due to such accidents, and in addition, the ends of the stringers are often inadvertently split or chipped.

This problem is especially critical wherein the pallets are of a heavy-duty type and are subjected to high loads and a greater amount of abuse. Experience has shown that a very large percentage of damage to conventional pallets occur in the end deck boards, and as a result an excessive amount of maintenance is required in repairing and replacing such end deck boards. The problem has proved to be so great that occasionally auxiliary pallet guards formed of heavy metal or the like have been employed in an effort to reduce the amount of damage caused to such conventional pallets, this arrangement being unwieldy and excessively expensive.

In order to overcome the disadvantages of the pallets heretofore known, the present invention provides an arrangement wherein the pallet is provided with a very rigid construction which is strong enough to support very heavy loads and which is adapted to successfully withstand rough usage, and yet wherein the weight of the device is maintained at a minimum.

The construction according to the present invention includes a plurality of elongated flat wooden boards, each of which has top and bottom edges connected by lateral surfaces. The lateral surfaces of adjacent boards are disposed in abutting relationship with one another and means is provided for holding the boards in such operative position.

The top edges of the boards are disposed substantially in a plane to define a deck supporting surface whereas the lower edges of the boards are so constructed and arranged as to provide in effect a plurality of stringers and a pair of fork ways.

The boards are securely fastened to one another as by means of adhesive or mechanical fastening means and the overall arrangement is a very compact one which is extremely strong and resists damage in a manner not obtained by prior art structures.

According to one modification of the invention, each of the boards is provided with a pair of spaced cut-out portions formed in the lower edge thereof, the cut-out portions of the boards being transversely aligned with one another so as to provide a pair of fork ways. An additional feature is the fact that the outermost boards of the pallet are formed of a relatively hard wood whereas the innermost boards are formed of a relatively soft wood. This is a highly advantageous arrangement since the soft inner boards reduce the weight to a minimum and yet provide a very rigid compact unit whereas the hard outermost boards serve as a very effective means for preventing damage to the ends of the pallet where the fork arms are liable to strike the pallet when being moved into the fork ways.

According to a second modification of the invention, a first plurality of boards is formed having a greater height than the second plurality of boards. The first plurality of boards are so disposed as to form stringers with the second plurality of boards interposed therebetween to form the fork ways. The boards of different width are again clamped in compressed position so as to provide a very rigid and compact unit.

The wooden pallet according to the present invention is also manufactured by a novel method so as to involve a minimum of skill in the construction thereof and so as to provide a very efficient and simple manner of constructing a pallet.

According to the novel method of the present invention, a plurality of elongated boards are first formed having top and bottom edges connected by lateral surfaces. The lateral surfaces are then disposed in abutting relationship with one another, and the assembly is placed under compression. The boards are then secured in this tightly compressed relationship so as to provide a unitary pallet of great strength and rigidity. According to the first modification of the invention, the fork ways are formed by cutting out spaced portions of the lower edges of the boards and disposing these cut-out portions in substantially transversely aligned relationship.

An object of the present invention is to provide a heavy-duty wooden pallet which is quite compact, rigid, and strong in construction.

Another object is the provision of a heavy-duty wooden pallet which eliminates the fastenings utilized in conventional pallets and which reduces the susceptibility to damage during heavy use.

A further object of the invention is to provide a heavy-duty wooden pallet which is relatively light in weight compared to other heavy-duty pallets, thereby facilitating handling and reducing the costs of shipping.

Still another object of the invention is to provide a heavy-duty wooden pallet having an especially strong end construction to resist damages to the end portions thereof.

A still further object of the invention is to provide a heavy-duty wooden pallet which is simple and inexpensive in construction and yet which is sturdy and reliable in operation.

Other objects and many attendant advantages of the invention will become more apparent when considered in connection with the specification and accompanying drawings, wherein:

FIG. 1 is a top perspective view of one embodiment of the present invention;

FIG. 2 is a bottom perspective view of the pallet shown in FIG. 1;

FIG. 3 is a sectional view taken along line 3—3 of FIG. 2 looking in the direction of the arrows;

FIG. 4 is a top perspective view of a modification according to the present invention;

FIG. 5 is a bottom perspective view of the pallet shown in FIG. 4;

FIG. 6 is a sectional view taken along line 6—6 of FIG. 4 looking in the direction of the arrows;

FIG. 7 is a bottom perspective view of a modified form of the invention;

FIG. 8 is a bottom perspective view of another modified form of the invention;

FIG. 9 is a sectional view taken along line 9—9 of FIG. 8 looking in the direction of the arrows; and FIG. 10 is a top perspective view of still another modified form of the invention.

Referring now to the drawing wherein like reference characters designate corresponding parts throughout the several views, the wooden pallet shown in FIGS. 1–3 and indicated generally by reference numeral 10 comprises a plurality of elongated flat boards 11 disposed in side-by-side relationship to one another.

Each of the boards includes a lengthwise dimension as indicated by arrow A in FIG. 1, and a height as indicated by arrow B in FIG. 1. Each of the boards includes a top edge and a bottom edge, these top and bottom edges being connected by opposite lateral surfaces.

The lateral surfaces of the boards are disposed in abutting relationship with the lateral surfaces of adjacent boards as is clearly shown in FIG. 3, for example. The top edges of the various boards are disposed substantially in a plane so as to provide a deck or supporting surface upon which materials may be stacked, the top edges cooperating to form a substantially solid flat deck surface.

In the modification shown in FIG. 1, each of the inner boards 11 is preferably formed of a relatively soft wood such as poplar or the like, whereas the outermost boards 15 are formed of a relatively hard wood such as oak, ash and similar hardwoods. When disposed in operative relationship as seen in FIG. 1, it is apparent that the outermost boards 15 formed of the harder or more dense wood form end portions of the pallet which are relatively strong and are adapted to resist damage to a high degree.

Each of the boards has formed in the lower edge thereof a pair of cut-outs, the cut-outs in end board 15 as seen in FIG. 1 being indicated by reference numerals 15′ and 15″. These cut-out portions are spaced from one another, and are shown as being of substantially U-shaped configuration although they may obviously be formed of rectangular configuration or other shape, if desired, the main consideration being to provide a flattened surface at the innermost portion of the cut-out portion for resting upon the flattened upper surface of the fork arms of a fork truck. Each of boards 11 is also provided with a pair of spaced cut-out portions identical with those provided in the end boards 15, each of the cut-out portions in the various boards being transversely aligned with one another as seen most clearly in FIG. 2, whereby a pair of fork ways are defined by the various cut-out portions. It is accordingly apparent that the construction is such that the assembly defines the two fork ways and three stringer portions indicated generally by reference numerals 16, 17, and 18, the lower surfaces of the stringer portions providing a base surface upon which the pallet normally rests when in operative position. As seen in FIG. 2, the base surface substantially lies in a first plane and the flat innermost portions of the fork ways lie substantially in a second plane spaced from said first plane.

Referring now to FIG. 3, it is seen that the end boards 15 which are formed of more dense or harder wood may have a slightly greater thickness than the inner boards 11 thereby providing reinforced end portions for the pallet and also providing an extra thickness for accommodating countersunk holes 20 in the outermost surfaces thereof.

As seen in FIGS. 1 and 2, three countersunk openings 20 are provided in each of end boards 15. Referring again to FIG. 3, a plurality of openings 21 are formed through each of boards 15, each of openings 21 being in communication with the central portion of the countersunk openings 20. Three openings 25 are also provided in each of boards 11, the openings 25 in boards 11 and the openings 21 in boards 15 being aligned with one another as shown in FIG. 3.

A rod 30 is inserted through the aligned openings 21 and 25, opposite ends of the rod being threaded and having threaded nuts 31 threaded thereon with washers 32 interposed between the nuts 31 and the bottom of the countersunk openings 20. It is apparent that by advancing nuts 31 along rod 30, the washers 32 are caused to bear against boards 15 so as to clamp the boards of the pallet in operative position.

In constructing the pallet as shown in FIGS. 1–3, the boards are first formed and then disposed in abutting relationship as shown. The boards may be secured to one another solely by means of the steel rods as shown, or they may be secured to one another by means of a suitable adhesive such as waterproof glue. The various boards may also be secured in operative relationship as by means of nails or the like. However, in any case, an important feature of the invention is the fact that after the boards are assembled in abutting relationship, they are suitably compressed as by inserting the assembly in a hydraulic press or by employing clamps engaging the outermost boards 15. Accordingly, the boards are fixedly secured while they are under compression such that when the compression force exerted by the press or jacks is released, the various boards of the pallet will remain in compressed relationship to form a rigid unit. In this connection, it should be noted that the use of relatively soft wood in boards 11 readily permits the desired compression.

The aligned holes formed in the various boards are preferably formed prior to assembling the boards in abutting relationship, although they may be formed after the boards are in assembled relationship. Similarly, the spaced cut-out portions in the boards may be formed in each individual board prior to assembling the boards in abutting relationship, or the cut-out portions may be formed after the boards have been assembled and disposed in compressed position, each fork way being formed by cutting the boards en masse.

Referring now to the modification shown in FIGS. 4–6, the wooden pallet indicated generally by reference numeral 40 comprises a first plurality of boards 41 having a height as indicated by arrow C and a second plurality of boards 42 are provided having a height which is substantially less than that of boards 41, the boards 42 being shown as having a height approximately half that of boards 41.

Each of the boards is disposed with the lateral surfaces thereof in abutting relationship, the boards being secured to one another as discussed in connection with the modification shown in FIGS. 1–3, wherein the boards are first positioned in abutting relationship and then compressed whereupon they are secured in such position as by means of rods extending through aligned openings in the boards or by means of a waterproof glue or other adhesive, or further by means of nails. As seen in FIG. 6, a rod 30′ is provided similar to rod 30 discussed in connection with FIG. 3, rod 30′ extending through aligned openings formed in the boards and having nuts 31′ threaded on the opposite ends thereof for maintaining the boards in operative position as previously disclosed.

Nuts 31′ are disposed within countersunk holes 20′ provided in the outermost boards 41 which may be of slightly greater thickness than the remaining boards 41 for accommodating the countersunk holes.

It should be noted that in each case, the rod means extend transversely to the length of the boards, the rods extending through the upper portion of boards 41 in the modification shown in FIGS. 4–6 such that the rods pass substantially through the central portion of each of boards 42.

In the modification shown in FIGS. 4–6, the boards 41 are so arranged to provide three stringer portions 45, 46, and 47 as seen in FIG. 5, the boards 42 of less height being interposed between these stringer portions such that the boards 42 define fork ways for receiving the fork arms of a fork truck.

The upper edges of boards 41 and 42 lie in a substantial plane so as to provide a flat relatively smooth deck surface for supporting objects thereon, the lower edges of boards 41 defining a base surface, and the lower edges of boards 42 defining the flattened innermost portions of the fork ways. It is noted that the end portions of the pallet as seen in FIGS. 4–6 which receive the fork arms of the fork truck also provide a very sturdy construction which readily resists damage due to misalignment of the fork arms with the fork ways should this occur during operation.

Referring now to FIG. 7 of the drawings, a modification is shown wherein the pallet indicated generally by reference numeral 50 includes a plurality of elongated boards 51 which are disposed with the lateral surfaces thereof in abutting relationship as in the modification shown in FIG. 1 by means of elongated rods extending through aligned openings in the boards and having nuts 52 threaded on the ends thereof whereby the various boards of the pallet are maintained in compressed operative relationship as discussed in connection with the modification shown in FIG. 1. The end boards may also be of slightly greater thickness to accommodate countersunk openings, and may be formed of a harder wood than the inner boards for the purpose hereinbefore described.

In the modification shown in FIG. 7, the fork ways 55 and 56 are defined by a pair of openings formed through each of the boards 51, these openings being aligned throughout the length of the pallet so as to provide the fork ways. These openings are formed prior to assembling the pallet, and then the various boards are disposed in operative position as shown. As seen, the cut-outs formed in the various boards of the pallet provide flattened surfaces substantially parallel to the upper and lower surfaces of the pallet which are adapted to rest upon the flattened upper surface of the work arms of a fork truck. Three stringer portions are defined by the pallet, the two fork ways being disposed between the central stringer and the outermost stringer.

Referring now to the modification shown in FIGS. 8 and 9, the pallet 60 provides a four-way entry in contrast to the previous modifications wherein only a two-way entry is provided. While it is evident that the modifications shown in FIGS. 1 and 4 may be provided with four-way entries, it is preferred to construct a four-way entry type pallet as shown in FIGS. 8 and 9.

A first plurality of boards 61 having a height indicated by arrow D are disposed in abutting relationship with one another and define stringers indicated by reference numerals 62, 63, and 64, the outermost boards preferably being of slightly greater thickness than the remaining boards to accommodate countersunk openings 65, the outermost boards also being preferably formed of a harder wood than the boards disposed inwardly thereof.

A second plurality of boards 70 having a height approximately ⅓ the height of boards 61 are disposed at the upper portion of the pallet in abutting relationship with one another, and a third plurality of boards 71 having a height substantially equal to that of boards 70 are disposed along the lower surface of the pallet in abutting relationship with one another.

As seen in FIG. 9, rods 74 extend through aligned openings in boards 61, 70, and 71 and maintain them in compressed operative relationship as shown, the rods extending through the central portions of the boards 70 and 71. Nuts 75 are threaded on the outer ends of rod 74 for maintaining the boards in operative position. It is apparent that the lower surfaces of boards 70 and upper surfaces of boards 71 are spaced from one another so as to provide fork ways indicated by reference numerals 76 and 77 adapted to receive the fork arms of a fork truck.

Referring again to FIG. 8, fork ways 80 and 81 are defined by openings formed in each of boards 61 in a manner similar to that in which the fork ways are formed in the boards shown in FIG. 7. The openings formed in each of boards 61 are aligned with one another and are formed prior to assembly. It is evident that the fork ways 76 and 77 intersect with fork ways 80 and 81 in the interior of the pallet, and no additional cut-outs need be provided in boards 70 or 71 since the space therebetween is adapted to receive the fork arms of a fork truck when the fork arms are inserted through fork ways 80 and 81 formed transversely through boards 61. Three stringer portions 82, 83, and 84 are also formed such that the central stringer 83 is disposed intermediate fork ways 80 and 81 and the outer stringers 82 and 84 are disposed at opposite sides of the fork ways 80 and 81.

Referring now to FIG. 10 of the drawings, a further modification is illustrated wherein the arrangement is such that the weight of the pallet is substantially reduced. In the pallet 90 as shown in FIG. 10, a first plurality of boards 91 identical with the boards 11 of the modification shown in FIG. 1 are disposed in spaced relationship to one another and are provided with cut-outs 91' and 91" in the undersurface thereof, the outermost boards being preferably of greater thickness than the inner boards to accommodate countersunk openings, and being formed of a harder wood than the inner boards.

Disposed in abutting relationship between each spaced pair of boards 91 are three boards 92, 93, and 94 of considerably reduced length, boards 92 having the outer end portions thereof aligned with one end portion of boards 91 and boards 94 having the outer end portions thereof aligned with the opposite ends of adjacent boards 91. Boards 93 are disposed at the central portions of boards 91 with the opposite ends thereof substantially aligned with the downwardly extending inner surfaces of the cut-outs 91' and 91" in the adjacent boards 91.

Rods extend through aligned openings in boards 91, 92, 93, and 94, and nuts 95 are threaded on the outer ends of the rods for clamping the boards in operative position. The arrangement as shown in FIG. 10 defines three stringers indicated by reference numerals 96, 97, and 98 with the fork ways being formed between the stringers and being defined by the cut-outs 91' and 91" in cooperation with the lateral surfaces of boards 92, 93, and 94, the innermost edges of boards 92 and 94 being substantially aligned with the outer downwardly extending portions of cut-outs 91' and 91" respectively.

While central boards 93 have been shown in FIG. 10 for the purpose of reinforcing the central portion of the pallet, it is also possible to construct an even lighter pallet by eliminating boards 93 and the rod extending therethrough while retaining the remaining structure shown in FIG. 10.

It is apparent from the foregoing that each modification of the invention provides an arrangement wherein a plurality of boards are secured together to form a unitary pallet with the lateral surfaces of the boards in tight abutting contact with one another. The top edges of the boards in each case define a solid relatively smooth supporting surface which is highly desirable, and a pair of fork ways are provided integrally in the pallet.

A particular advantage of the present invention is the ease of maintenance of the various forms of the pallet. The pallets are not only adapted to resist damage normally caused to the end portions of the pallet, but if such damage should occur to the end boards of the pallet according to the present invention, this damage can be repaired in a most simple manner merely by removing the outermost boards and replacing them with new boards. Since elongated rods are utilized for clamping the boards in operative position, there are no nails to come loose as in conventional constructions, and accordingly, this common problem is eliminated in the present invention.

Whereas the boards have been shown as secured in operative position by means of steel rods or the like, it is apparent that they may be secured solely by utilizing an adhesive while under pressure, or in addition, the boards may be adhesively secured together and also provided with steel rods to provide an even greater securing force maintaining the boards in operative position.

The modifications shown in FIGS. 1–3, and 7–10 are particularly effective since the outermost boards 15 are of greater thickness than the remaining boards and are formed of a denser or harder wood such that they are well-adapted to resist damage if accidentally struck by fork arms or if dropped on such end portions.

The novel method according to the present invention includes the steps of first forming the boards, and then disposing them in side-by-side relationship with the lateral surfaces thereof abutting one another. An important feature of the method is the fact that the boards are then compressed so as to urge the lateral surfaces into more firm contact with one another whereupon the boards are secured in operative position as aforedescribed. The fork ways may be formed inherently in the construction shown in FIGS. 4–6, 8 and 9, wherein boards of two different heights are employed, and fork ways are formed in the modification shown in FIGS. 1–3, and 7–10 by cutting out portions of the boards.

It is apparent from the foregoing that there is provided a new and novel heavy-duty wooden pallet which is quite rigid, compact, and very strong in construction. The conventional fastenings employed with prior art pallets are eliminated thereby providing a pallet which is less susceptible to damage. The construction according to the invention is relatively lightweight compared to other heavy duty pallets and provides an especially strong end construction. The pallet is quite simple and inexpensive in construction, and yet is sturdy and reliable in operation. In addition, there is provided a novel method for constructing the pallet in a very simple and expeditions manner.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A heavy-duty wooden pallet comprising a plurality of elongated flat boards, each of said boards having top and bottom edges connected by opposite lateral surfaces, the lateral surfaces of adjacent boards being disposed in abutting relationship with one another, the boards being transversely aligned, means securing the boards together and maintaining the boards in operative position with the inner boards compressed between the outermost boards thereof, the top edges of said boards being substantially co-planar and defining a deck supporting surface, the bottom edges of said boards lying in at least two different planes to define a base surface and a pair of fork ways, said base surface comprising three stringers, two of the stringers being disposed at the outermost edges of the pallet and the other of the stringers being disposed at an intermediate portion of the pallet and separating the fork ways from one another.

2. A heavy-duty wooden pallet comprising a plurality of elongated flat boards, each board having top and bottom edges connected by lateral surfaces, the lateral surfaces of adjacent boards being disposed in abutting relationship with one another, means securing said boards in operative position, the top edges of said boards defining a supporting deck, the bottom edges defining a base surface and a pair of fork ways, the outermost boards of said pallet being formed of relatively hard wood, and the inner boards of the pallet being formed of relatively soft wood, whereby the end portions of the pallet are adapted to resist damage during operation.

3. Apparatus as defined in claim 2, wherein the lower edge of each of said boards includes cut-out portions for receiving the fork arms of a fork truck or the like, the cut-out portions of the different boards being transversely aligned with one another.

4. A heavy duty wooden pallet comprising a plurality of elongated flat wood boards, each board having top and bottom edges connected by lateral surfaces, the lateral surfaces of adjacent boards being disposed in abutting relationship with one another, means securing said boards in operative position, the top edges of said boards defining a supporting deck and the bottom edges of said boards defining a base surface, and a pair of fork ways formed through intermediate portions of said boards, each of the outermost boards of said pallet being formed of relatively hard wood and the inner portion of the pallet being formed of relatively soft wood whereby the end portions of the pallet are adapted to resist damage during operation.

5. A heavy duty wooden pallet comprising a plurality of elongated flat wood boards, each of said boards having top and bottom edges connected by lateral surfaces, the lateral surfaces of adjacent boards being secured in abutting relationship with one another, means for holding said boards in operative position, the top edges of some of the boards being substantially co-planar to define a deck supporting surface, the bottom edges of a first plurality of said boards being disposed substantially in a first plane, the top edges of a second plurality of said boards being disposed substantially in a second plane, said first plane being spaced from said second plane to define fork ways therebetween, and a pair of fork ways extending substantially normally to said first-mentioned fork ways, said last-mentioned fork ways being formed through an intermediate portion of some of said boards.

6. A heavy duty pallet comprising a plurality of elongated flat boards, each of said boards having top and bottom edges connected by opposite lateral surfaces, the lateral surfaces of adjacent boards being disposed in abutting relationship with one another, means securing the boards together and maintaining the boards in operative position with the inner boards compressed between the outermost boards thereof, a first plurality of said boards being spaced from one another and spanning the entire length of the pallet, a second plurality of said boards having a length substantially less than that of said first plurality of boards, said second plurality of boards being spaced from one another to define fork ways therebetween, said first plurality of boards having cut-out portions formed in the bottom edges thereof for defining fork ways in cooperation with said second plurality of boards.

7. A heavy-duty wooden pallet comprising a plurality of elongated flat boards, each of said boards having top and bottom edges connected by lateral surfaces, the lateral surfaces of adjacent boards being secured in abutting relationship with one another, means for holding said boards in operative position, the top edges of said boards being substantially co-planar to define a deck supporting surface, the bottom edges of a first plurality of said boards being disposed substantially in a first plane to define a base surface comprising stringers, the bottom edges of the remaining boards being disposed substantially in a second plane to define fork ways for receiving the fork arms of a fork truck or the like, said stringers being three in number, two of the stringers being disposed at the outermost edges of the pallet and the other of said stringers being disposed at an intermediate portion of the pallet and separating the fork ways from one another.

8. A heavy-duty wooden pallet comprising a plurality of boards, each of the boards being substantially flat and of greater width and length than the thickness thereof and thus presenting relatively wide opposed sides, the wide sides of each board being in contacting relationship, the outermost boards of said pallet being formed of relatively hard wood and the inner portion of the pallet being formed of relatively soft wood, spaced apart lift fork passageways extending through the plurality of boards, and means extending through all of the boards for effecting compressing movement of the end harder wood boards toward each other to place a permanent and continuing compression on all of the plurality of boards, said harder outermost boards absorbing the destructive effects of contact by the lift fork whereby the effective useful life of the wooden pallet is extended.

References Cited in the file of this patent

UNITED STATES PATENTS

| | | |
|---|---|---|
| 609,795 | De Man | Aug. 30, 1898 |
| 1,340,018 | Connor | May 11, 1920 |
| 1,394,119 | Rockwell | Oct. 18, 1921 |
| 1,944,237 | Heineman | Jan. 3, 1934 |
| 2,118,048 | Landsem | May 24, 1938 |
| 2,260,716 | Kotler | Oct. 24, 1941 |
| 2,305,817 | Sukohl | Dec. 22, 1942 |
| 2,372,055 | Braun | Mar. 20, 1945 |
| 2,436,554 | Cruickshank | Feb. 24, 1948 |
| 2,509,682 | Golrick | May 30, 1950 |

FOREIGN PATENTS

| | | |
|---|---|---|
| 129,085 | Sweden | Aug. 8, 1950 |